United States Patent Office 3,293,329
Patented Dec. 20, 1966

3,293,329
O,O-DIMETHYL-O-(3-CHLORO-4-N,N-DILOWER ALKYLSULFAMOYLPHENYL)THIONOPHOSPHATES
Saichiro Kuramoto and Yoshihiko Nishizawa, Toyonaka-shi, Keimei Fujimoto, Minoo-shi, Hideo Sakamoto, Itami-shi, Masataka Nakagawa, Yamatotakada-shi, and Toshio Mizutani, Amagasaki-shi, Japan, assignors to Sumitomo Chemical Company, Ltd., Osaka, Japan, a corporation of Japan
No Drawing. Filed July 29, 1964, Ser. No. 386,065
5 Claims. (Cl. 260—944)

This application is the continuation-in-part of the U.S. Serial No. 169,602, filed Jan. 29, 1962 now abandoned.

The present invention relates to new organophosphorus compounds and to the insecticidal compositions containing the same. More particularly, the invention relates to phosphorus compounds having N,N-dialkylsulfamoylchlorophenyl radical and having the general formula,

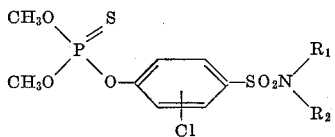

wherein $R_1$ and $R_2$ are respectively a lower alkyl radical of from 1 to 4 carbon atoms, and to the new insecticidal compositions containing the said compound as the essential active ingredient.

Further, the present invention relates to a method for producing the above mentioned compounds, comprising condensing O,O-dimethyl phosphorochloridothioate with an N,N-dialkylsulfamoylchlorophenol or its alkali metal salt having the general formula,

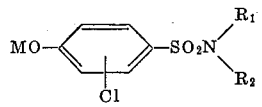

wherein M is a member selected from the group consisting of hydrogen and alkali metal atoms, and $R_1$ and $R_2$ are a lower alkyl radical of from 1 to 4 carbon atoms respectively.

The compounds of the invention are of particular value in destruction of agriculturally injurious insects, such as Lepidoptera, Diptera and Coleoptera, especially borers of rice, for example, rice stem borer (*Chilo suppressalis* Walker), paddy borer (*Schoenobius incertellus* Walker), purplish stem borer (*Sesamina inferens* Walker), and others (such as *Chilo plejadellus* Zinck, *Chilotrea polychrysa* Meyr., *Scirpophaga albinella* Cramer, *Scirpophaga innotata* Walker, *Eldana dichromellus* Walker and *Elasmopalpus lignosellus* Zeller), and sanitary injurious insects, especially house fly (*Musca domestica* Linne), and its larva, and the like. The new organophosphorus compounds have not only a very high insecticidal activity but has at the same time a very low toxicity to warm-blooded animals.

Accordingly, an object of the present invention is to provide new organophosphorus compounds which are very useful as essential active ingredients of pesticidal composition and further have a characteristic of long residual effect with economical advantage. Another object of the invention is to provide insecticidal composition suitable for agricultural and sanitary uses which have an extremely lower order of toxicity towards warm-blooded animals, but has a very higher degree of insecticidal activity, compared with that of the conventional insecticides. Other objects and advantages will be apparent from the description stated hereunder.

It is well known that organophosphoric acid esters having 4-nitrophenyl radical, for example, parathion and methyl parathion, possess a high degree of insecticidal activity and consequently are very useful as the active ingredient in insecticidal compositions. However, they have, at the same time, a very high degree of toxicity towards warm-blooded animals and this is, indeed, the disadvantage of these compounds. Therefore, many attempts have been made to find compounds having lower toxicity and higher insecticidal activity and compounds such as Chlorthion and Dicapthon have been found as the results of their efforts. However, these so-called low toxicity insecticidal compounds are nevertheless less satisfactory than is desired from the standpoint of insecticidal activity, residual effect and insecticidal spectrum.

The present inventors have made various studies for the purpose of obtaining the compounds which had a low toxicity, a long residual effect, and also a high degree of insecticidal activity, such compound being anxiously desired in rice producing districts. As the results, the inventors have succeeded in obtaining the present compounds which have not only the extremely low toxicity but also the superior activity towards insects extensively, compared with that of any conventional insecticidal compounds.

The organophosphorus compounds according to the present invention, having the general formula,

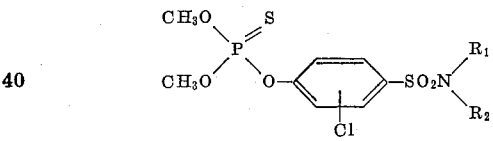

wherein $R_1$ and $R_2$ have the same meanings as above-identified, are new compounds unknown in any of preceding literatures. In order to produce the compounds according to the invention, O,O-dimethyl phosphorochloridothioate is condensed with a phenol compound having the general formula,

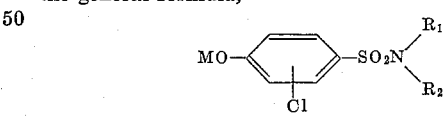

wherein M, $R_1$ and $R_2$ have the same meanings as above-identified.

O,O-dimethylphosphorochloridothioate having the following formula,

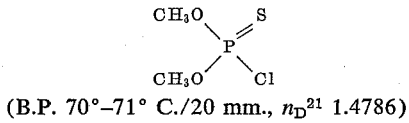

(B.P. 70°–71° C./20 mm., $n_D^{21}$ 1.4786)

may be prepared according to the known processes, for example, according to the process disclosed in J. Am. Chem. Soc. 72, 2461 (1950), Chem. Abst. 53, 1205, ibid., 52, 294.

The N,N-dialkylsulfamoylchlorophenol compounds employed in the process of the invention and having the general formula,

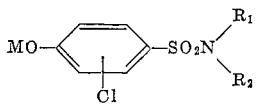

wherein M is a member selected from the group consisting of hydrogen and alkali metal atoms, and $R_1$ and $R_2$ are a lower alkyl radical of from 1 to 4 carbon atoms respectively, may be prepared from N,N-dialkylsulfamoylchloro-aminobenzenes by diazotization according to the known procedures, for example, according to the process as disclosed in Organic Synthesis Vol. 23, p. 11. The typical compounds which fall within this scope of definition include

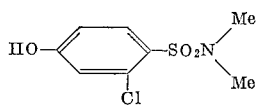

M.P. 122°–124° C.

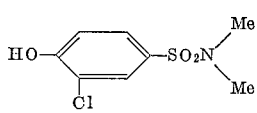

M.P. 108°–110° C.

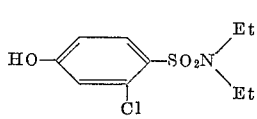

M.P. 75°–78° C.

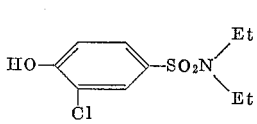

M.P. 62°–67° C.

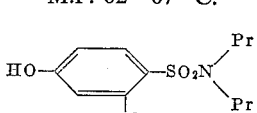

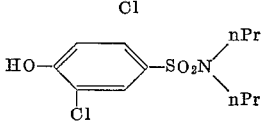

M.P. 105°–108° C.

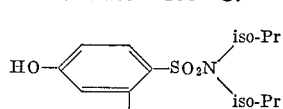

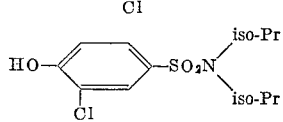

These phenols may be converted to the alkali salts, for example, by contacting with a caustic alkali, metallic alkali, alkali metal alcoholate, and the like, in water or an organic solvent. The alkali may be sodium, potassium, or others.

In the method of this invention, the condensation reaction of these raw materials may successfully be carried out by mixing the both parties at the ratio of at least equal molecular weights, or if possible, with excess of the phosphorus chloride compounds. In this case, it is preferable to carry out the reaction in an inert organic solvent by use of almost equimolar quantities of the said two compounds in general. For example, when the phosphorus chloride compound is mixed with an alkali metal phenolate compound in an inert organic solvent and then heated, a de-alkali metal chloride reaction takes place and the compound of this invention can be produced as the result. When the free phenol is utilized in place of the said alkali metal phenolate, the present reaction proceeds according to the so-called de-hydrogen chloride reaction, and in such case, the said reaction may preferably be carried out in the presence of a well known deacid agent, for example, such organic bases as pyridine and diethylamine, such alkali metal carbonates and bicarbonates as sodium carbonate, potassium carbonate, sodium bicarbonate, potassium bicarbonate and ammonium bicarbonate. The inert organic solvent utilized in the present reaction may include any kind of well known solvent, provided that it does not affect the present reaction, for example hydrocarbon solvents, such as benzene, toluene and xylene, halogenated hydrocarbon solvents, such as chlorobenzene and o-dichlorobenzene, alcohols, such as ethanol and isopropanol, ketones, such as acetone, methyl ethyl ketone and methyl isobutyl ketone and others. Though the present reaction may proceed within a broad temperature range of from room temperature to 120° C., for example, only by standing the reaction mixture at room temperature for a long period of time, it is in general preferable to heat the mixture at a temperature between 60° and 100° C., at which the reaction completes within several hours. Furthermore, the present reaction is preferably carried out in the presence of catalyst such as copper powder and cuprous salts, in good yield.

When the reaction is over, the precipitated alkali metal chloride or hydrochloric acid salt of organic base is filtered off, or alternatively, an adequate quantity of water is added to the reaction mixture to dissolve the by-produced salts and the water layer is separated off, and then the organic layer is well washed with water and evaporated in vacuo to obtain the objective compound as residue in good yield. By the above-mentioned procedure, a sufficiently pure compound for most of practical use may be obtained, but, if necessary, thus obtained compound may be further purified.

The compounds of the following formula

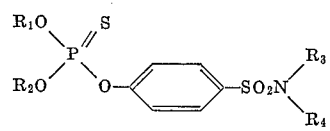

wherein $R_1$ and $R_2$ are lower alkyl radicals of from 1 to 4 carbon atoms and $R_3$ and $R_4$ are hydrogen or lower alkyl radicals of from 1 to 6 carbon atoms, are already disclosed in the specification of U.S. Patent No. 3,005,004 prior to the present invention, however the series of those known compounds are not as yet satisfactory in the insecticidal activities and toxicities to the warm-blooded animals.

The improvement in the activities and toxicities was first made by the present inventors by introducing chlorine atom into the phenol nucleus. And as to the alkyl radicals bound to the oxygen atoms, methyl radical was found to be most effective.

As to the position of the chlorine atom, 3-position of the phenol nucleus yields more effective component than 2-position.

The tables 1 to 4 set forth the efficacies, toxicities of the typical compounds of the invention, comparing with the others.

TABLE 1

| Compound | Azuki bean weevils dipping test, LC$_{50}$ (p.p.m.)[1] | Rice stem borer topical application test, LD$_{50}$ (γ/larva)[2] | Relative efficacy towards rice stem borer, pot test[3] | House flies bait test, LC$_{50}$ (p.p.m.)[4] | Oral toxicity towards mice, LD$_{50}$ (kg./kg.) |
|---|---|---|---|---|---|
| (CH$_3$O)$_2$P(S)-O-C$_6$H$_4$-SO$_2$N(CH$_3$)$_2$ | 200 | 0.2 | 100 | 5,000 | 9.5 |
| (CH$_3$O)$_2$P(S)-O-C$_6$H$_4$-SO$_2$N(C$_2$H$_5$)$_2$ | 50 | 7.0 | 10 | 1,000 | 142.0 |
| (CH$_3$O)$_2$P(S)-O-C$_6$H$_4$-SO$_2$N(n-C$_3$H$_7$)$_2$ | 196 | 0.7 | 50 | 500 | 184.0 |
| (CH$_3$O)$_2$P(S)-O-C$_6$H$_4$-SO$_2$N(i-C$_3$H$_7$)$_2$ | 25 | 20.0 | 20 | 1,200 | 587.0 |
| (CH$_3$O)$_2$P(S)-O-C$_6$H$_3$(Cl)-SO$_2$N(CH$_3$)$_2$ | 30 | 3.0 | 33 | 6,000 | 9.6 |
| (CH$_3$O)$_2$P(S)-O-C$_6$H$_3$(Cl)-SO$_2$N(C$_2$H$_5$)$_2$ | 30 | 4.0 | 50 | 500 | 16.0 |
| (CH$_3$O)$_2$P(S)-O-C$_6$H$_3$(Cl)-SO$_2$N(n-C$_3$H$_7$)$_2$ | 150 | 5.5 | 33 | 2,000 | 49.5 |
| (CH$_3$O)$_2$P(S)-O-C$_6$H$_3$(Cl)-SO$_2$N(i-C$_3$H$_7$)$_2$ | 200 | 10.0 | 10 | 3,000 | 60.0 |
| (CH$_3$O)$_2$P(S)-O-C$_6$H$_3$(Cl)-SO$_2$N(CH$_3$)$_2$ | 33 | 0.2 | >100 | 400 | 48.0 |
| (CH$_3$O)$_2$P(S)-O-C$_6$H$_3$(Cl)-SO$_2$N(C$_2$H$_5$)$_2$ | 20 | 0.09 | 100 | 150 | 250.0 |
| (CH$_3$O)$_2$P(S)-O-C$_6$H$_3$(Cl)-SO$_2$N(n-C$_3$H$_7$)$_2$ | 100 | 0.2 | 100 | 500 | 500.0 |
| (CH$_3$O)$_2$P(S)-O-C$_6$H$_3$(Cl)-SO$_2$N(i-C$_3$H$_7$)$_2$ | 10 | 0.3 | 100 | 700 | >1,000 |

[1] The dipping test was conducted by using Azuki bean weevils as follows. An emulsifiable concentrate of each compound was prepared and the concentrate was diluted with water to obtain various concentrations of the test emulsions (ca. 1/100–1/100,000). To these emulsions, each group of 30 weevils was dipped for 1 minute and then transferred to a Petri dish having a sheet of filter paper at the bottom. After standing overnight at 27° C., the dead and the survival numbers of the weevils were counted. This experiment was triplicated and the LC$_{50}$ value was calculated, based upon the concentration utilized and the kill percent, on each compound.

[2] The topical application test was conducted by using hibernating larvae of rice stem borer as follows. Each compound was dissolved into acetone to prepare a series of acetone solution containing from 0.067 to 2 g./100 ml. of the said compound. Each 1/1000 ml. of the said solution was applied to the body of the larvae by means of micrometer syringe and, after keeping it for 3 days at 25° C., its death or survival condition was observed. The larvae used in this test had almost the same body weights ranging from 80 to 90 mg. and each solution was applied to a group of these 20 larvae in order to calculate the mean fatal percent.

[3] The relative efficacy towards rice stem borer was determined by the so-called pot test by spraying the test medium on the host rice plant infected with the larvae of first instar and each value was determined by comparing the efficacy (kill percent of the test compound towards rice stem borer with that of parathion (=100). The pot test was conducted by the following manner. The rice plants, 45–50 days from planting, were transplanted into a Wagner's pot (whose surface area was 1/50,000 of 10 ares) and after a further 20–30 days the plants were infected with the eggs of rice stem borer. After 4 days from the hatching of the insects, the rice plants in each pot were sprayed with an emulsion of the test compound made by aqueous dilution of a 50% emulsifiable concentrate composition (comprised of 50 parts active ingredient, 35 parts Triton X-100 (a polyethylene glycol nonylphenyl ether) and 15 parts xylene, by weight). After 3 days from the spray, the mortalities of the larvae of rice stem borer were observed.

[4] The bait test was conducted as follows. Waste bait from which the breeded larvae of house fly have been reared was mixed with sugar, and the mixture was distributed into beakers of about 300 ml. volume in each 200 g. amount per beaker. Then, each emulsion preparation of the various concentrations of the test compounds was sprayed onto the surface of the bait in an amount of 1 ml./beaker. The beakers were placed in a cage, and adult house flies (4 days after emergence) were set free therein. The mortalities after 24 hours from spray were observed.

TABLE 2

| Concentration of the compound (p.p.m.) | Full grown larvae of mosquito, dipping (kill percent)[1] | | | | |
|---|---|---|---|---|---|
| | 0.1 | 0.03 | 0.01 | 0.003 | 0.001 |
| COMPOUNDS | | | | | |
| (CH$_3$O)$_2$P(S)-O-C$_6$H$_4$-SO$_2$N(CH$_3$)$_2$ | 100 | 0 | 0 | 0 | 0 |
| (CH$_3$O)$_2$P(S)-O-C$_6$H$_4$-SO$_2$N(C$_2$H$_5$)$_2$ | 100 | 0 | 0 | 0 | 0 |
| (CH$_3$O)$_2$P(S)-O-C$_6$H$_3$(Cl)-SO$_2$N(CH$_3$)$_2$ (Cl ortho to O) | 100 | 0 | 0 | 0 | 0 |
| (CH$_3$O)$_2$P(S)-O-C$_6$H$_3$(Cl)-SO$_2$N(C$_2$H$_5$)$_2$ (Cl ortho to O) | 100 | 40 | 20 | 0 | 0 |
| (CH$_3$O)$_2$P(S)-O-C$_6$H$_3$(Cl)-SO$_2$N(CH$_3$)$_2$ (Cl ortho to SO$_2$N) | 100 | 60 | 10 | 0 | 0 |
| (CH$_3$O)$_2$P(S)-O-C$_6$H$_3$(Cl)-SO$_2$N(C$_2$H$_5$)$_2$ (Cl ortho to SO$_2$N) | 100 | 100 | 100 | 10 | 10 |

[1] The dipping test was conducted as follows. Into each aqueous solution of several concentrations of the test compound, were steeped full grown larvae of mosquito for 24 hours, and the mortalities were observed.

TABLE 3

[Azuki bean weevils (adult), film contact method [1] (LC$_{50}$ x 10,000) (Residual effect on grass plate)]

| Lapse of from film making | 1 day | 4 days | 7 days | 14 days |
|---|---|---|---|---|
| COMPOUNDS | | | | |
| (CH$_3$O)$_2$P(S)-O-C$_6$H$_3$(CH$_3$)-SCH$_3$  —  Baycid | 36 (100) | 3.6 (10) | 3.0 (8) | 0.63 (2) |
| (C$_2$H$_5$O)(C$_6$H$_5$)P(S)-O-C$_6$H$_4$-NO$_2$  —  EPN | 25 (100) | 12.5 (50) | 7.0 (28) | 4.1 (16) |
| (CH$_3$O)$_2$P(S)-O-C$_6$H$_3$(Cl)-SO$_2$N(C$_2$H$_5$)$_2$  —  Compound of the present invention. | 5.8 (100) | 4.6 (79) | 4.8 (83) | 2.0 (34) |

NOTE.—The number in the ( ) shows the relative efficacy towards the same compound of the activity of after 1 day from the application, which was conducted in every time.

[1] The film contact method was as follows:

One milliliter of each acetone solution of various concentration of the test compound was dropped into the bottom of a Petri dish of 9 cm. diameter and 2 cm. height. The acetone was allowed to evaporate by standing for about 3 hours, whereby a film of the test compound was left at the bottom for the residual effect test. After each 1, 4, 7 and 14 days from the film making, azuki bean weevils (adult) were subjected to crawl to contact with the compound on the surface of the bottom of the Petri dish Mortalities of after each 24 hours from the contact were observed.

TABLE 4

[Twenty eight spotted lady beetles (adult) topical application LD$_{50}$ ($\gamma$/insect)]

| Compound | LD$_{50}$ |
|---|---|
| (C$_2$H$_5$O)$_2$P(S)—O—C$_6$H$_4$—NO$_2$ <br> Parathion | 0.076 |
| (CH$_3$O)$_2$P(O)—CH(OH)—CCl$_3$ <br> Dipterex | 0.98 |
| (CH$_3$O)$_2$P(S)—O—C$_6$H$_3$(Cl)—SO$_2$N(C$_2$H$_5$)$_2$ <br> Compound of the present invention | 0.48 |

In order to put the phosphorothioates of the present invention into practical use, various inert carriers may be combined therewith to make an insecticidal composition containing a toxic quantity of at least one of the said compounds. As for the said compositions, such formulations as emulsion, suspension, dust, oil and granule preparations may be included.

An emulsion preparation of the compounds of the invention may be prepared, for example, by mixing the compound with at least one of organic solvents and an emulsifier in a proper proportion to make an emulsifiable concentrate and by diluting the thus obtained concentrate with water at the time of use. As the organic solvent, an aromatic hydrocarbon such as benzene and xylene is preferred and, as the emulsifier, in general, either a nonionic or a blend of nonionic and anionic surface active agents may be suitable. The mixing ratio of these ingredients can be selected according to the material to be utilized and to the object of the preparation. However, in general, 25–50 weight parts of the compound of the present invention may be combined with 50–10 weight parts of a solvent and 25–40 weight parts of a surface active agent to obtain a good emulsifiable concentrate. In some cases, the compound of the present invention may be combined merely with a surface active agent to obtain an emulsifiable concentrate. At the time of use, the said concentrate is diluted with an adequate quantity of water to make an emulsion and the thus obtained emulsion is sprayed directly.

To provide a wettable powder, the compound of the present invention is mixed with a wetting agent and is further combined with a powdered carrier. As the wetting agent, either a nonionic or a blend of nonionic and anionic surface active agents may successfully be employed, and as the powdered carrier, such carriers as talc, kaolin, diatomaceous earth and synthetic silicate may be utilized. The powdered carrier preferably has a particle size of 200 mesh through. The mixing ratio of the ingredients of the wettable powder may be from 5 to 25 weight percent of the compound of the present invention, from 1 to 10 weight percent of the surface active agent and the remaining weight percent of the powdered carrier, but these ratios may freely be varied in accordance with the particular use to which the preparation is to be put. A suitable suspension for practical use may easily be prepared from the said wettable powders merely by putting them into water.

By mixing the present compound with a powdered carrier, a dust formulation may be obtained. It may be prepared by admixing the ingredients directly, but preferably the compound of the present invention may be dissolved into a solvent having a low boiling point, the solution admixed with the carrier, and the solvent evaporated off, to obtain a dust. The dust formulation preferably contains from 1 to 5% by weight of the active compound of the invention. Any of the materials described for use in the production of the wettable powders may be used as carrier in such dust formulations.

Further, the compound of the invention may be dissolved in a solvent such as deodorized kerosene to make an oil preparation. The solubility in kerosene of the present compound is poor and an auxiliary solvent may be used. Suitable auxiliary solvents are aromatic hydrocarbon solvents such as benzene, xylene and methylnaphthalene.

Still further, a granule preparation of the compound of the present invention may be prepared, for example, by mixing the compound with a surface active agent and a powdered carrier, kneading the resulting mixture together with polyvinyl alcohol and water, molding and drying the resulting product, the surface active agent and the powdered carrier being the same as above-explained.

As for the manufacturing method of the insecticide containing the compound of this invention, it would be apparently known to those skilled in the art that any recipe other than those described above may be utilized according to the common methods for preparing organophosphorus insecticides. Moreover, the insecticidal compositions of the present invention may satisfactorily be compounded with other material such as an active ingredient of another type of insecticide such as other organophosphorus, organochlorine, carbamate and pyrethroid insecticides, an acaricidal, a nematocidal, a fungicidal and an herbicidal component, a fertilizer and an earth improving material, so far as it is compatible with the compound of the invention, to make a multi-purpose composition.

The present invention will be illustrated by the following examples, without, however, being limited thereto. Unless otherwise provided, all parts are represented by weights.

Example 1

A mixture of 23.7 g. of 4-hydroxy-2-chlorobenzenesulfon-N,N-dimethylamide and 18.9 g. of anhydrous potassium carbonate in 100 ml. of methyl isobutyl ketone was heated to about 100° C., whereby the generating carbon dioxide and an azeotropic mixture of water and a part of methyl isobutyl ketone were removed therefrom, to leave a suspension of potassium 3-chloro-4-N,N-dimethylsulfamoylphenolate. O,O-dimethyl phosphorochloridothioate (16.1 g.) was added dropwise to the suspension at approximately 60° C., and, thereafter, heated to 60°–80° C. for 8 hours. After cooling, the organic solvent layer was washed with water, with an aqueous sodium carbonate solution, and again with water, followed by drying on anhydrous sodium sulfate.

The methyl isobutyl ketone solvent was distilled off in vacuo, to leave white crystals of O,O-dimethyl-O-(3-chloro-4-N,N-dimethylsulfamoylphenyl) thionophosphate which weighed 31.6 g. and melted at 60°–62° C. (from methanol).

*Analysis.*—Calculated (for C$_{10}$H$_{15}$O$_5$ClNPS$_2$): N, 3.89; P, 8.6; S, 17.8; Cl, 9.87%. Found: N, 3.65; P, 8.4; S, 17.3; Cl, 9.92%.

Example 2

A mixture of 19.0 g. of 4-hydroxy-2-chlorobenzenesulfon-N,N-diethylamide, 80.0 g. of toluene, 1.5 g. of anhydrous cuprous chloride, 1.0 g. of active carbon and 11.6 g. of O,O-dimethyl phosphorochloridothioate was heated up to 55° C. while being vigorously stirred. Five and a half grams of anhydrous potassium carbonate was added thereto at the same temperature during 30 minutes. Thereafter the reaction mixture was stirred for 3 hours at 80° C. and then allowed to stand overnight at room temperature. After cooling, the reaction mixture was filtered to separate the solid substances. The filtrate was washed with a dilute aqueous sodium carbonate solution and with water, and dried over anhydrous sodium sulfate. The toluene solvent was distilled off in vacuo. The resulting residue was recrystallized from methanol. Thus, 26.0 g. of O,O-dimethyl-O-(3-chloro-4-N,N-diethylsulfamoylphenyl) thionophosphate was obtained, yield 93.0%, M.P. 41°–43° C.

Analysis.—Calculated (for $C_{12}H_{19}O_5ClNPS_2$): N, 3.61; P, 8.00; S, 16.51; Cl, 9.16%. Found: N, 3.60; P, 8.15; S, 16.47; Cl, 9.01%.

Example 3

A mixture of 8.0 g. of 4-hydroxy-2-chlorobenzenesulfon-N,N-di-n-propylamide, 3.0 g. of anhydrous potassium carbonate and 60.0 g. of methyl isobutyl ketone was heated up to 40° C. while being vigorously stirred. Four and two fifth grams of O,O-dimethyl phosphorochloridothioate was added thereto and thereafter heated to 75° C. for 5 hours. After cooling, the organic solvent layer was washed with water, with an aqueous sodium carbonate solution, and again with water.

The methyl isobutyl ketone solvent was distilled off in vacuo, to leave 9.0 g. of O,O-dimethyl-O-(3-chloro-4-N, N - di - n - propylsulfamoylphenyl)thionophosphate, $n_D^{25}$ 1.5300, which was purified by passing through an active alumina column using toluene for analysis.

Analysis.—Calculated (for $C_{14}H_{12}O_5ClNPS_2$): N, 3.37; P, 7.46; S, 15.40; Cl, 8.56%. Found: N, 3.34; P, 7.82; S, 15.1; Cl, 8.26%.

Example 4

A solution of 3 parts of O,O-dimethyl-O-(3-chloro-4-N,N-dimethylsulfamoylphenyl) thionophosphate in 20 parts of acetone was mixed well with 97 parts of 200 mesh talc, and the acetone was allowed to evaporate from the mixture to leave a 3% dust.

Rice plants of 10 days before the earing stage, planted in a Wagner's pot (having surface area of 1/50,000 of 10 ares), were sprayed with the 3% dust in an amount of 0.3 g. by means of a Bell jar duster. After 30 seconds, the pot was taken out and the plants were infected with adult of leaf-hopper (*Cicadella viridis* Linné) while the pot was covered with a cage. Almost 100% of the insect was killed after 24 hours.

Example 5

An emulsifiable concentrate was obtained by uniformly mixing 25 parts of O,O-dimethyl-O-(3-chloro-4-N,N-dimethylsulfamoylphenyl) thionophosphate, 50 parts of xylene and 25 parts of Triton X-100 (polyethylene glycol nonylphenyl ether) in the described order.

The insecticidal preparations set forth in Table 2 were sprayed to a rice plant field of 80 days after the transplantation in an amount of each 15 liters/are, at three blocks each preparation (a block being 1 are). The effectivenesses were determined by randomly sampling 50 stocks from a block after about one month and counting the living larvae encroaching in the stems.

TABLE 5

| Preparations | Concentration of emulsifiable concentrate, percent | Degree of dilution of the emulsifiable concentrate | Ratio of living larvae in the stem [1] |
|---|---|---|---|
| EPN (emulsion) | 50 | ×750 | 1.55 |
| Parathion (emulsion) | 50 | ×1,000 | 1.65 |
| Compound of the Example (emulsion) | { 25 | ×500 | 0.75 |
|  | { 25 | ×350 | 0.60 |
| Nontreatment | | | 5.20 |

[1] Number of living larvae in 50 stocks sampled. / Number of stems of 50 stocks.

Example 6

The insecticidal preparations as set forth in Table 6 were sprayed to a garden of plum trees, which had been infected by a number of black market prominent (*Phalera flavescens* Bremer & Grey). After 24 hours, the number of mortal insects (falling down to the ground) and that of surviving insects (living on the branches) were counted. The data are the average number of 3 times.

TABLE 6

| Preparations | Concentration of emulsifiable concentrate, percent | Degree of dilution of emulsifiable concentrate | Surviving number | Mortal number |
|---|---|---|---|---|
| Parathion (emulsion) | 50 | ×2,000 | 50 | 18 |
| Sumithion (emulsion) | 50 | ×2,000 | 8 | 21 |
| Emulsion of Example 3 | 25 | ×1,000 | 1 | 32 |
| Nontreatment | | | 29 | 0 |

Note.—Sumithion:

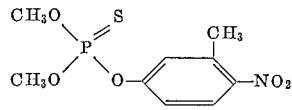

Example 7

Five parts of O,O-dimethyl-O-(3-chloro-4-N,N-dimethylsulfamoylphenyl) thionophosphate, 3 parts of Triton X-100 (a polyethylene glycol nonylphenyl ether) and 90 parts of 300 mesh talc were well mixed, and the mixture was kneaded with 2 parts of polyvinyl alcohol and a small amount of water. The kneaded product was granulated by means of a granulater and then dried to form a 5% granule preparation.

Rice plants of 60 days after sowing, planted in Wagner's pots were sprayed with the granule preparation at the base of the plants in an amount of 300 mg./pot by means of Bell jar duster. After 5 days, *Nilaparvata lugens* Stal (Brown planthopper) infected to the rice plants could be completely destroyed.

Example 8

An emulsifiable concentrate was prepared by uniformly mixing 25 parts of O,O-dimethyl-O-(3-chloro-N,N-diethylsulfamoylphenyl) thionophosphate, 50 parts of benzene and 25 parts of Triton X-100 in the described order.

Rice plants of 60 days after sowing, planted in Wagner's pots, were sprayed with 10 ml./pot of the emulsions as described in Table 7. Each 3, 5 and 7 days after the spray, eggs of the larvae of rice stem borer (just before the hatching) were infected. After each 3 days, the plants were examined and the mortalities obtained. The higher mortalities for a longer period of time means more excellent residual insecticidal power.

TABLE 7

| Preparations | Concentration of emulsifiable concentrate, percent | Degree of dilution of emulsifiable concentrate | Mortalities (percent) | | |
|---|---|---|---|---|---|
| | | | 3 days | 5 days | 7 days |
| EPN (emulsion) | 50 | ×1,000 | 100 | 100 | 100 |
| Parathion (emulsion) | 50 | ×1,000 | 98.9 | 56.8 | 58.8 |
| Emulsion of the example | 25 | ×500 | 100 | 100 | 88.9 |

Example 9

The preparations as described in Table 8 were sprayed to rice plants in a rice field after about 90 days from the transplantation, whereby the insecticidal effects to rice stem borer at the second generation were tested. The tests were effected three times each section (one are) in an amount of 15 l./are. After about one month, 50 stocks were randomly sampled from each section to count the living insects and damaged stems.

TABLE 8

| Preparations | Concentration of the emulsifiable concentrate, percent | Degree of dilution of emulsifiable concentrate | Ratio of damaged stem | Number of living larvae in stems |
|---|---|---|---|---|
| EPN (emulsion) | 50 | ×2,000 | 6.7 | 46 |
| Sumithion (emulsion) | 50 | ×2,000 | 8.8 | 105 |
| Emulsion of Example 6 | 25 | ×1,000 | 5.0 | 71 |
| Nontreatment |  |  | 11.6 | 148 |

*Example 10*

The insecticidal preparations as set forth in Table 9 were sprayed to a garden of grape trees after the harvest, which had been infected by a number of grape leaf hopper (*Eryocosmus apicalis* Nawa). The tests were effected two times each section (one are). The amount sprayed was 15 liter/are. After each 7, 11, 14, and 17 days from the spray, 4 of the blanches of the grape trees in each section were randomly taken and infected with grape leaf hoppers. The blanches were covered with a net and the mortalities after 24 hours observed.

TABLE 9

| Ingredient | Concentration of the emulsifiable concentrate, percent | Degree of dilution of the emulsifiable concentrate | Mortalities | | | |
|---|---|---|---|---|---|---|
| | | | 7 days | 11 days | 14 days | 17 days |
| Malathon (emulsion) | 50 | ×2,000 | 60.3 | 35.4 | 40.8 | 46.0 |
| Sumuthion (emulsion) | 50 | ×2,000 | 71.3 | 84.2 | 83.1 | 70.5 |
| Emulsion of Example 6 | 25 | ×1,000 | 85.7 | 52.8 | 47.5 | 50.0 |
| Nontreatment |  |  | 0 | 21.3 | 14.8 | 19.7 |

Note.—Malathon:

$$\begin{array}{c} CH_3O \\ \phantom{aa} \diagdown \phantom{aa} \\ CH_3O \end{array} \!\! \begin{array}{c} S \\ \| \\ P \end{array} \!\! -S-\underset{\underset{CH_2 \cdot COOC_2H_5}{|}}{CH \cdot COOC_2H_5}$$

*Example 11*

The insecticidal ingredients as described in Table 10 were sprayed to rice plants at the earing stage, planted

TABLE 10

| Ingredient | Concentration of the emulsifiable concentrate, percent | Degree of dilution of the emulsifiable concentrate | Mortalities | | | | |
|---|---|---|---|---|---|---|---|
| | | | 1 day | 3 days | 5 days | 8 days | 10 days |
| Malathon (emulsion) | 50 | ×4,000 | 100 | 32.6 | 26.9 | 7.0 | |
| | | ×2,000 | 100 | 72.5 | 48.5 | 3.6 | |
| Sumithion (emulsion) | 50 | ×4,000 | 62.5 | 38.9 | 33.8 | 5.3 | |
| | | ×2,000 | 70.8 | 43.1 | 59.3 | 25.3 | 16.3 |
| Baycid (emulsion) | 50 | ×4,000 | 96.4 | 83.1 | 82.8 | 43.0 | 44.9 |
| | | ×2,000 | 100 | 92.2 | 96.8 | 67.4 | 29.0 |
| Emulsion of Example 6 | 25 | ×4,000 | 72.8 | 80.0 | 68.5 | 19.3 | 26.4 |
| | | ×2,000 | 85.9 | 82.6 | 97.2 | 50.0 | 51.3 |
| Nontreatment |  |  | 0 | 3.0 | 5.6 | 4.5 | 9.5 | in Wagner's pots, in an amount of 10 ml./pot. After each 1, 3, 5, 8 and 10 days, the plants were infected with adult of green rice leaf-hopper and covered by a net. After 24 hours, the mortalities were observed. The data are the average of two experiments.

*Example 12*

An oil preparation was prepared by dissolving 0.3 g. of O,O - dimethyl-O-(3-chloro-N,N-isopropylsulfamoylphenyl) thionophosphate in 1.7 g. of xylene and diluting the solution was kerosene to make the volume 100 ml.

One milliliter of the oil preparation was sprayed onto house flies (adult) in a settling tower. After 5 minutes, the house flies were killed. Similarly, an oil preparation temperature room at 25° C. After 20 hours, 100% of the house flies were killed. Similarly, an oil preparation containing Sumithion and that containing Baycid were tested, both of which showed about ½ insecticidal power.

*Example 13*

A mixture of 10 g. of O,O-dimethyl-O-(3-chloro-N,N-n-propylsulfamoylphenyl) thionophosphate and 2.5 g. of Triton X–100 was dropped into 83.5 g. of 300 mesh talc while being mixed in a mixer, thereby to obtain 10% wettable powder.

The powder was dispersed in water of 50 times weight and the dispersion was sprayed to a favorite haunt of house flies in an amount of 50 ml./m². The emergence of house flies was prevented almost completely, the result being similar to wettable powder of malathon.

We claim:

1. A thionophosphorus compound having the formula, $$\begin{array}{c} CH_3O \\ \phantom{aa} \diagdown \phantom{aa} \\ CH_3O \end{array} \!\! \begin{array}{c} S \\ \| \\ P \end{array} \!\! -O- \!\! \left\langle \!\! \begin{array}{c} Cl \\ \end{array} \!\! \right\rangle \!\! -SO_2N \!\! \begin{array}{c} R_1 \\ \diagdown \\ R_2 \end{array}$$

wherein $R_1$ and $R_2$ are respectively a lower alkyl radical of from 1 to 4 carbon atoms.

2. O,O - dimethyl-O-(3 - chloro-4-N,N - dimethylsulfamoylphenyl) thionophosphate.

3. O,O-dimethyl-O-(3-chloro-4 - N,N - diethylsulfamoylphenyl) thionophosphate.

4. O,O-dimethyl-O - (3-chloro-4 - N,N-di-n-propylsulfamoylphenyl) thionophosphate.

5. O,O-dimethyl - O - (3-chloro-4-N,N-di-isopropylsulfamoylphenyl) thionophosphate.

References Cited by the Examiner

UNITED STATES PATENTS

| 2,701,259 | 2/1955 | Schrader | 260—461 |
| 3,005,004 | 10/1961 | Berkelhammer | 260—461 |
| 3,091,565 | 5/1963 | Suzuki et al. | 260—461 XR |

OTHER REFERENCES

Metcalf: "Organic Insecticides," Interscience Publishers, Inc., New York, New York (1955), page 292, SB 951 M68.

CHARLES B. PARKER, *Primary Examiner.*

JOSEPH P. BRUST, RICHARD L. RAYMOND, FRANK M. SIKORA, *Assistant Examiners.*